(12) United States Patent
Naya et al.

(10) Patent No.: US 12,289,540 B2
(45) Date of Patent: Apr. 29, 2025

(54) IMAGING METHOD AND IMAGING DEVICE CALCULATING THE CORRELATION BETWEEN LIGHT INTENSITY AND A SPATIALLY MODULATED MASK IMAGE TO CONSTRUCT AN IMAGE OF A TARGET OBJECT

(71) Applicant: FUJIFILM Corporation, Tokyo (JP)

(72) Inventors: Masayuki Naya, Kanagawa (JP); Ryusuke Osaki, Kanagawa (JP); Sohichiro Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 173 days.

(21) Appl. No.: 18/348,311

(22) Filed: Jul. 6, 2023

(65) Prior Publication Data

US 2023/0353888 A1   Nov. 2, 2023

Related U.S. Application Data

(63) Continuation of application No. PCT/JP2022/000523, filed on Jan. 11, 2022.

(30) Foreign Application Priority Data

Jan. 12, 2021   (JP) ................................. 2021-002822

(51) Int. Cl.
*H04N 5/335* (2011.01)
*G02B 26/08* (2006.01)
(Continued)

(52) U.S. Cl.
CPC ......... *H04N 23/95* (2023.01); *G02B 26/0833* (2013.01); *H04N 23/56* (2023.01)

(58) Field of Classification Search
None
See application file for complete search history.

(56) References Cited

U.S. PATENT DOCUMENTS 9,064,327 B2 *   6/2015   Shibata ................. G06T 3/4023
12,108,164 B2 *  10/2024   Haruse .................. G01S 17/894
(Continued)

FOREIGN PATENT DOCUMENTS

| JP | 2003223642 | 8/2003 |
| WO | 2020149140 | 7/2020 |
| WO | 2020218282 | 10/2020 |

OTHER PUBLICATIONS

Graham M. Gibson et al., "Single-pixel imaging 12 years on: a review", Optics Express, Sep. 2020, pp. 28190-28208.
(Continued)

*Primary Examiner* — Gary C Vieaux
(74) *Attorney, Agent, or Firm* — JCIPRNET

(57) ABSTRACT

Pixels of a mask image with which a target object is irradiated are shifted by a determined distance by sequentially turning on one light emission point or two or more light emission points of a light source with respect to a single mask pattern generated in a spatial modulation element, a pixel shift amount of the mask pattern determined by a position of the light emission point to be turned on of the light source is known, the target object is irradiated with mask images according to a plurality of mask patterns depending on the positions of the light emission point of the light source and the spatial modulation element, and a computer calculates a correlation between a light intensity detected by a detector and the mask image with which the target object is irradiated, to construct an image of the target object. With this, an imaging device and an imaging method capable of achieving an increase in speed of mask pattern irradiation in single-pixel imaging and significantly increasing an input speed of single-pixel imaging are provided.

20 Claims, 7 Drawing Sheets

(51) Int. Cl.
    *H04N 23/56*      (2023.01)
    *H04N 23/95*      (2023.01)

(56) References Cited

U.S. PATENT DOCUMENTS

| | | | |
|---|---|---|---|
| 2015/0042717 A1* | 2/2015 | Shibata | G06T 3/4023 |
| | | | 347/14 |
| 2018/0048811 A1 | 2/2018 | Waller et al. | |
| 2021/0341618 A1 | 11/2021 | Gomi et al. | |
| 2022/0038625 A1 | 2/2022 | Gomi et al. | |
| 2024/0241056 A1* | 7/2024 | Perillo | G02B 21/0076 |

OTHER PUBLICATIONS

"Search Report of Europe Counterpart Application", issued on Jun. 10, 2024, pp. 1-12.

Kyuki Shibuya, "A Study of Single-Pixel Imaging", Doctoral Thesis, Intelligent Structures and Mechanics Systems Engineering, Graduate School of Advanced Technology and Science, Tokushima University, Sep. 2018, pp. 1-104, No Translation Provide.

"International Search Report (Form PCT/ISA/210) of PCT/JP2022/000523," mailed on Mar. 8, 2022, with English translation thereof, pp. 1-5.

"Written Opinion of the International Searching Authority (Form PCT/ISA/237) of PCT/JP2022/000523," mailed on Mar. 8, 2022, with English translation thereof, pp. 1-6.

\* cited by examiner

FIG. 1
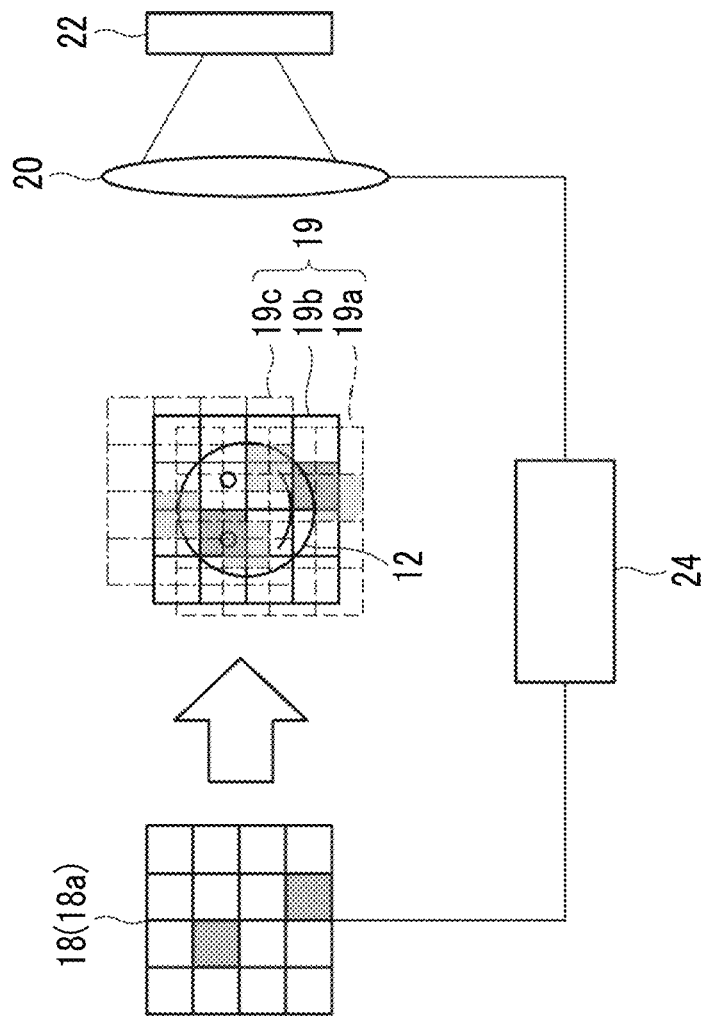
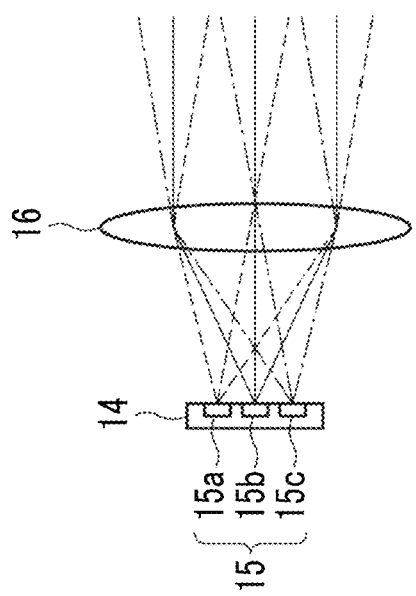

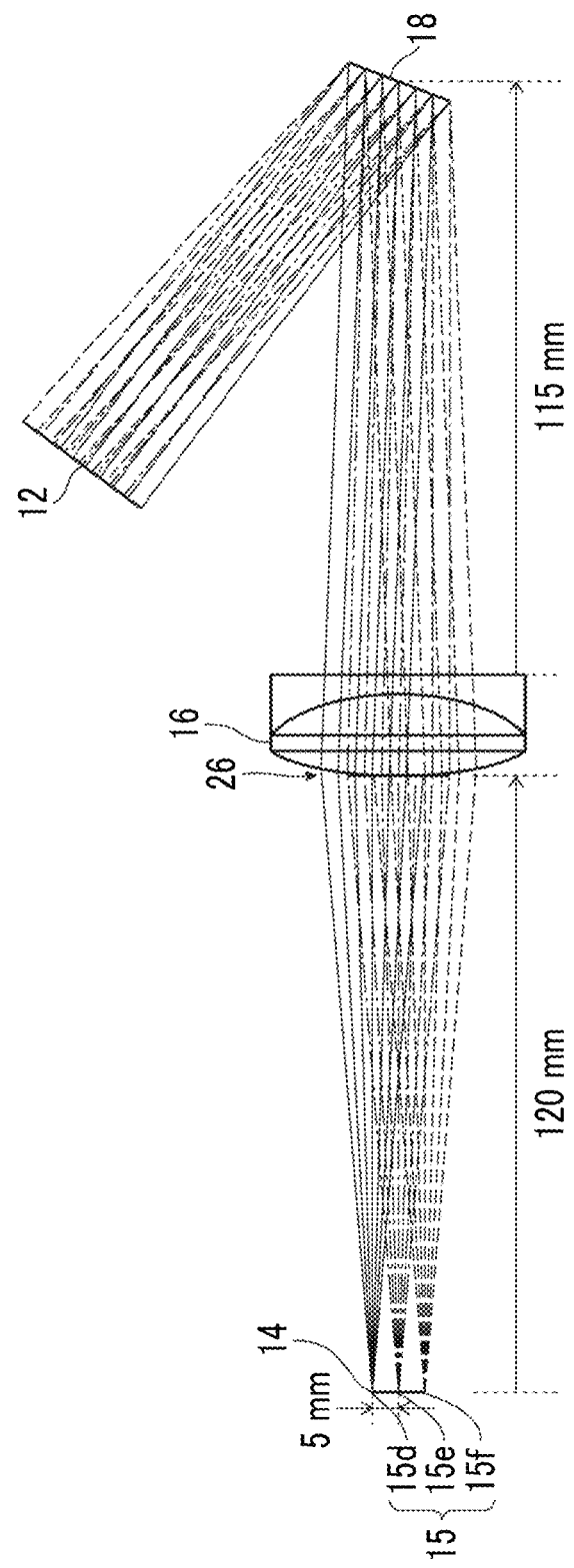

IMAGING METHOD AND IMAGING DEVICE CALCULATING THE CORRELATION BETWEEN LIGHT INTENSITY AND A SPATIALLY MODULATED MASK IMAGE TO CONSTRUCT AN IMAGE OF A TARGET OBJECT

CROSS-REFERENCE TO RELATED APPLICATIONS

This application is a Continuation of PCT International Application No. PCT/JP2022/000523 filed on Jan. 11, 2022, which claims priority under 35 U.S.C. § 119(a) to Japanese Patent Application No. 2021-002822 filed on Jan. 12, 2021. The above applications are hereby expressly incorporated by reference, in their entirety, into the present application.

BACKGROUND OF THE INVENTION

1. Field of the Invention

The present invention relates to an imaging method and an imaging device using a single-pixel imaging technique. In detail, the present invention relates to an imaging method and an imaging device that significantly increases an input speed of single-pixel imaging.

2. Description of the Related Art

Hitherto, a technique of single-pixel imaging that acquires intensity information obtained by superimposition of an image of a target object and a mask pattern known in advance using a number of mask patterns and by taking correlation between the obtained intensity information and a mask pattern group to perform imaging of the target object has been suggested (see A Study of Single-Pixel Imaging, Kyuki Shibuya, 2018, A Thesis for a degree of doctor (Optics), Thesis, Intelligent Structures and Mechanics Systems Engineering, Graduate School of Advanced Technology and Science, The university of Tokushima University).

As described in A Study of Single-Pixel Imaging, Kyuki Shibuya, 2018, A Thesis for a degree of doctor (Optics), Thesis, Intelligent Structures and Mechanics Systems Engineering, Graduate School of Advanced Technology and Science, The university of Tokushima University, in the technique of single-pixel imaging of the related art, after light from a light source is converted into collimate light, for example, a target object is irradiated with the collimate light as light having a mask image modulated corresponding to a mask pattern of a two-dimensional random mask shown in (a) of FIG. 7 in a spatial light modulator (SLM), such as a digital mirror device (DMD), light transmitted through or reflected by the target object is condensed, and a light intensity of the condensed light is detected by one photodetector. Here, the mask pattern is changed successively, and the light intensity at a point of time at which each mask pattern is presented is recorded. In a case where time-series data of the light intensity obtained in this manner is represented by, for example, a matrix (column vector) Y of one column of detection values, the mask pattern at each point of time is represented by, for example, an encoding matrix W, and image information (image data) of the target object is represented by a matrix (column vector) X of one column, an expression Y=WX is established. A principle that the image information X of the target object is restored by solving (approximating) the expression for X as $X=W^{-1}Y$ is used.

FIG. 6 shows the principle of the technique of single-pixel imaging described above.

An imaging device 100 shown in FIG. 6 is a device that acquires image information of a target object 102 as an object to be measured by the technique of single-pixel imaging described above. The imaging device 100 has a light source 104, a collimator lens 106, a spatial modulation element 108, a condenser lens 110, a single detector 112, and a computer 114.

Here, the collimator lens 106 converts light from the light source 104 into collimate light. The spatial modulation element 108 is irradiated with the collimate light.

The spatial modulation element 108 generates and presents a plurality of mask patterns 108a. The spatial modulation element 108 causes the collimate light from the collimator lens 106 to be transmitted through or reflected according to one generated mask pattern 108a (in FIG. 6, only reflection is described) to modulated mask image (light) 109. The condenser lens 110 condenses all of light transmitted through or reflected by the target object 102 to the detector 112 in a case where the target object 102 is irradiated with the mask image (light) 109 from the spatial modulation element 108. The detector 112 detects a light intensity of all of light condensed in one mask pattern 108a. The detector 112 is a detector that does not perform imaging and a single-pixel detector having one light-receiving element.

In FIG. 6, a plurality of mask patterns 108a generated by the spatial modulation element 108 are represented by, for example, mask patterns 1, 2, 3, ..., and M. In this case, the mask pattern 1 is a mask pattern of, for example, a two-dimensional rectangular matrix where N pixels are arranged vertically and horizontally, and can be represented as [$W_{11}$, $W_{12}$, ..., $W_{1N}$] by converting the two-dimensional N pixels into a matrix of one row and N columns. Similarly, the mask pattern 2 can be represented as a matrix of one row and N columns, [$W_{21}$, $W_{22}$, ..., $W_{2N}$], and the mask pattern M can be represented as a matrix of one row and N columns, [$W_{M1}$, $W_{M2}$, ..., $W_{MN}$]. In this manner, the mask patterns 1, 2, 3, ..., and M can be represented as an encoding matrix W of M rows and N columns represented by Expression (1) described below as described in FIG. 6 corresponding to the spatial modulation element 108. Each element of the encoding matrix W, that is, each of the elements $W_{11}$, ..., and $W_{MN}$ of each of the mask patterns 1, 2, 3, ..., and M is not particularly limited, and, for example, are 1 for transmission and 0 for reflection or can be reversed.

$$W = \begin{bmatrix} W_{11} & W_{12} & \cdots & W_{1N} \\ W_{21} & W_{22} & \cdots & W_{2N} \\ \vdots & \vdots & \ddots & \vdots \\ W_{M1} & W_{M2} & \cdots & W_{MN} \end{bmatrix} \quad (1)$$

In a case where each mask pattern of the mask patterns 1, 2, 3, ..., and M presented in the spatial modulation element 108 is used, and in a case where the detection values of the light intensities detected in the detector 112 are referred to as $Y_1, Y_2, \ldots,$ and $Y_M$, respectively, in FIG. 6, as described corresponding to the detector 112, a matrix Y of M rows and one column represented by Expression (2) described below can be represented.

Here, in a case where the image information (image data) of the target object 102 is referred to as $X_1, X_2, \ldots,$ and $X_N$, as described in FIG. 6 corresponding to the target object 102, a matrix X of M rows and one column represented by Expression (3) described below can be represented.

As a result, the detection value Y can be represented by Y=WX as Expression (4), and as described above the imaging device 100 shown in FIG. 6, Expression (4) can be represented as matrixes by Expression (4) described below.

$$Y = \begin{bmatrix} Y_1 \\ Y_2 \\ \vdots \\ Y_M \end{bmatrix} \quad (2)$$

$$X = \begin{bmatrix} X_1 \\ X_2 \\ \vdots \\ X_N \end{bmatrix} \quad (3)$$

$$Y = \begin{bmatrix} Y_1 \\ Y_2 \\ \vdots \\ Y_M \end{bmatrix} = \begin{bmatrix} W_{11} & W_{12} & \ldots & W_{1N} \\ W_{21} & W_{22} & \ldots & W_{2N} \\ \vdots & \vdots & \ddots & \vdots \\ W_{M1} & W_{M2} & \ldots & W_{MN} \end{bmatrix} \times \begin{bmatrix} X_1 \\ X_2 \\ \vdots \\ X_N \end{bmatrix} \quad (4)$$

The computer 114 can generate a plurality of two-dimensional mask patterns 1, 2, . . . , and M that are generated in the spatial modulation element 108, and accordingly, it can be said that the encoding matrix W of M rows and N columns is already provided. The detection value Y ($Y_1$, $Y_2$, . . . , and $Y_M$) in a case where a plurality of two-dimensional mask patterns 1, 2, . . . , and M and the mask patterns 1, 2, . . . , and M, and accordingly, the encoding matrix W of M rows and N columns have a correlation. As described above, since the detection value Y, the encoding matrix W, and the image information X are represented by Y=WX as Expression (4) described above, the image information X can be represented by $X=W^{-1}Y$ as Expression (5) where $W^{-1}$ is an inverse matrix of the encoding matrix W, and Expression (5) can be represented as matrixes by Expression (5) described below.

Accordingly, the image information of the target object 102, that is, image data X ($X_1$, $X_2$, . . . , and $X_N$) of all pixels can be calculated by Expression (5) described below by calculating the correlation between the detection value Y ($Y_1$, $Y_2$, . . . , and $Y_M$) measured in the imaging device 100 shown in FIG. 6 and the encoding matrix W. The correlation of the encoding matrix W, the detection value Y, and the image information X can be calculated through measurement in advance.

$$\begin{bmatrix} X_1 \\ X_2 \\ \vdots \\ X_N \end{bmatrix} = \begin{bmatrix} W_{11} & W_{12} & \ldots & W_{1N} \\ W_{21} & W_{22} & \ldots & W_{2N} \\ \vdots & \vdots & \ddots & \vdots \\ W_{M1} & W_{M2} & \ldots & W_{MN} \end{bmatrix}^{-1} \times \begin{bmatrix} Y_1 \\ Y_2 \\ \vdots \\ Y_M \end{bmatrix} \quad (5)$$

SUMMARY OF THE INVENTION

As described above, in single-pixel imaging, since no imaging element is used and the single detector is used, there is an advantage that sensitivity improvement that is not obtained in an imaging element, such as a complementary metal-oxide semiconductor (CMOS) or a charge-coupled device (CCD), is obtained, and imaging can be performed by a simple and inexpensive system even in an expensive wavelength range, such as an infrared range or an ultraviolet range, where there is no imaging element or in a case of weak light that should be measured at a photon counting level.

On the other hand, to obtain high-definition image information, there is a need for a mask having the same number of independent mask patterns as the number of pixels of an image desired to be reproduced. Note that, in the technique of single-pixel imaging of the related art, mask pattern generation (presentation) is performed by the single spatial modulation element. For this reason, in the related art, for the mask pattern generation by the single spatial modulation element, there is a problem that a switching speed of a mask is restricted by a response speed of the spatial modulation element, and a sufficient speed cannot be obtained.

In this way, in the single-pixel imaging method of the related art, since a repetition frequency of the mask pattern is restricted by the response speed of the spatial modulation element, there is a defect that high-speed image acquisition is difficult. That is, there is a problem that a speed of image acquisition of single-pixel imaging depends on a switching speed of switching the mask pattern of the spatial modulation element. Since the switching speed of the mask pattern is, for example, an order of kHz in a liquid crystal spatial modulation element and 20 kHz even in a DMD, the number of required mask patterns is an order of 1,000 to 20,000 in a second, and in a case of producing a fine image, the total number of pixels increases, there is a problem that a lot of time is needed, and a changing image cannot be obtained.

For this reason, while a technique capable of compressing mask information, that is, the number of mask patterns by an approach in terms of an information theory, there is still a problem that there is a need for a mask of 30 to 40% of the number of pixels.

In A Study of Single-Pixel Imaging, Kyuki Shibuya, 2018, A Thesis for a degree of doctor (Optics), Thesis, Intelligent Structures and Mechanics Systems Engineering, Graduate School of Advanced Technology and Science, The university of Tokushima University, while various technique of single-pixel imaging that compensate for the defect are disclosed, it is not sufficient. While a sub-pixel shift method is applied to the technique of single-pixel imaging disclosed in A Study of Single-Pixel Imaging, Kyuki Shibuya, 2018, A Thesis for a degree of doctor (Optics), Thesis, Intelligent Structures and Mechanics Systems Engineering, Graduate School of Advanced Technology and Science, The university of Tokushima University, to perform pixel shift and to decrease required mask information, since this method depends on a mechanical operation, such as moving one light source or minor, there is a problem that high-speed mask modulation is impossible and an sufficient increase in speed is not achieved.

An object of the present invention is to provide an imaging method and an imaging device that solve the problems and the objects in the related art, and enable high-speed switching of a mask pattern at a response speed of light emission of the light source by superimposing light emission pattern switching of a plurality of light emission points of the light source on modulation of a spatial modulation element, achieve an increase in speed of mask pattern irradiation in single-pixel imaging, and significantly increase an input speed of single-pixel imaging using a light source having a plurality of light emission points as a light source.

To attain the above-described object, there is provided an imaging method of a first aspect of the present invention comprising: by a computer, calculating, in irradiating a spatial modulation element configured to generate a plurality of mask patterns, with light from a light source having a plurality of light emission points, irradiating a target object with a mask image modulated according to the mask pattern generated by the spatial modulation element, condensing light transmitted through or reflected by the target object irradiated with the mask image, and detecting a light intensity of the condensed light by a detector, for all combinations of the plurality of mask patterns and a light emission pattern of the light emission points to be sequentially switched, a correlation between the mask image according to the mask pattern that generates pixel shift by sequentially switching and turning on one light emission point or two or more light emission points to be made to emit light simultaneously among the plurality of light emission points with respect to the single mask pattern generated in the spatial modulation element, and the light intensity detected by the detector when the target object is irradiated with the mask image, to acquire an image of the target object, in which pixels of the mask image with which the target object is irradiated are shifted by a determined distance by sequentially turning on one light emission point or two or more light emission points of the light source with respect to the single mask pattern generated in the spatial modulation element, a pixel shift amount of the mask pattern determined by a position of the light emission point to be turned on of the light source is known, and the target object is irradiated with the mask images according to the plurality of mask patterns depending on the positions of the light emission points of the light source and the spatial modulation element, and the computer calculates the correlation between the light intensity detected by the detector and the mask image with which the target object is irradiated, to construct the image of the target object.

To attain the above-described object, there is provided an imaging device of a second aspect of the present invention comprising a light source having a plurality of light emission points, a spatial modulation element that generates a plurality of mask patterns, a first optical system that irradiates the spatial modulation element with light from the light emission points of the light source, a second optical system that irradiates a target object with a mask image modulated according to the mask patterns generated by the spatial modulation element irradiated with light from the light emission points of the light source, a detector that condenses light transmitted through the target object or reflected by the target object irradiated with the mask image and detects a light intensity of the condensed light, and a computer that calculates, for all combinations of the plurality of mask patterns and a light emission pattern of the light emission points to be sequentially switched, a correlation between the mask image according to the mask pattern that generates pixel shift by sequentially switching and turning on one light emission point or two or more light emission points to be made to emit light simultaneously among the plurality of light emission points with respect to the single mask pattern generated in the spatial modulation element, and the light intensity detected by the detector when the target object is irradiated with the mask image, to acquire an image of the target object, in which pixels of the mask image with which the target object is irradiated are shifted by a determined distance by sequentially turning on one light emission point or two or more light emission points of the light source with respect to the single mask pattern generated in the spatial modulation element, a pixel shift amount of the mask pattern determined by a position of the light emission point to be turned on of the light source is known, and the target object is irradiated with the mask images according to the plurality of mask patterns depending on the positions of the light emission points of the light source and the spatial modulation element, and the computer calculates the correlation between the light intensity detected by the detector and the mask image with which the target object is irradiated, to construct the image of the target object.

In the first aspect and the second aspect, it is preferable that the light source is a vertical cavity surface emitting laser (VCSEL) array.

It is preferable that the light source is a light emitting diode (LED) array or an edge emitting semiconductor laser array.

It is preferable that the spatial modulation element is a digital minor device (DMD) or a liquid crystal spatial modulation element (SLM).

It is preferable that the one light emission point or the two or more light emission points to be made to emit light simultaneously of the light source are sequentially switched and turned on in a period from generation of the mask image of the mask pattern of the spatial modulation element to generation of the mask image of the next mask pattern.

It is preferable that the pixel shift amount of a mask pattern, with which the target object is irradiated, by position movement of the light emission point of the light source is 10% or more of one pixel either vertically or horizontally.

It is preferable that an optical system including a first optical system and a second optical system from the light source to the target object is a telecentric optical system.

It is preferable that the first optical system has a collimator lens between the light source and the spatial modulation element, and the spatial modulation element is disposed on a back focal plane of the collimator lens.

It is preferable that the mask patterns that are generated by the spatial modulation element have no periodic structure within a range of pixel shift generated by sequentially switching and turning on the light emission points.

It is preferable that the mask patterns that are generated by the spatial modulation element are random patterns or Hadamard patterns.

According to the present invention, the light source having a plurality of light emission points is used as a light source, whereby it is possible to provide an imaging method and an imaging device that enables high-speed switching of a mask pattern at a response speed of light emission of the light source by superimposing light emission pattern switching of a plurality of light emission points of the light source on modulation of a spatial modulation element, can achieve an increase in speed of mask pattern irradiation in single-pixel imaging, and can significantly increase an input speed of single-pixel imaging.

BRIEF DESCRIPTION OF THE DRAWINGS

FIG. 1 is a schematic view showing an example of an imaging device that carries out an imaging method of the present invention.

FIG. 3 is a schematic side view showing a pixel shift optical system in the imaging device shown in FIG. 1.

Figure 5:
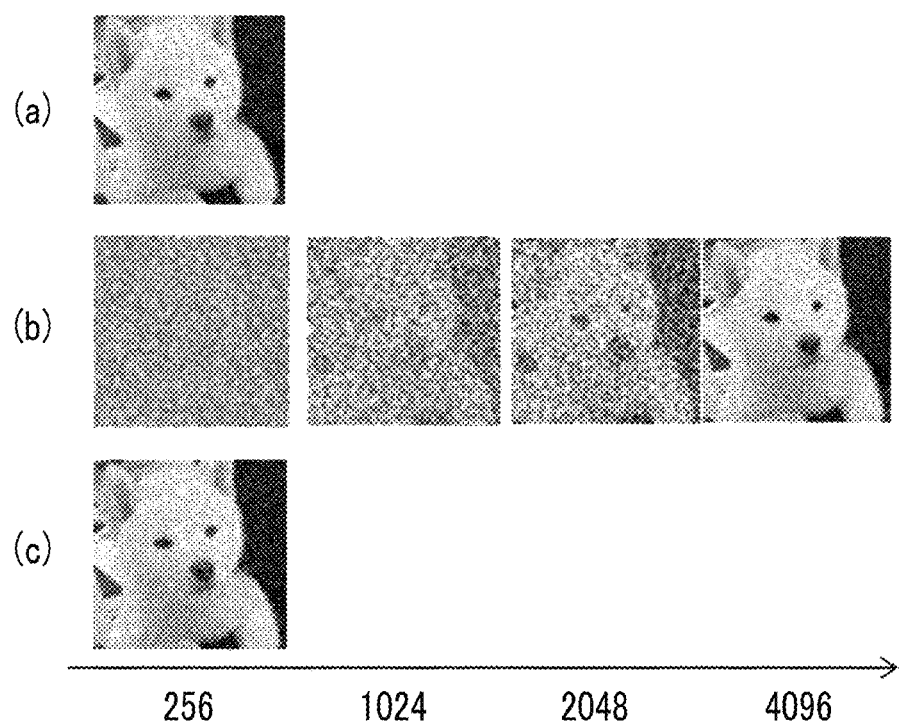

(a) of FIG. 5 is a diagram showing an original image of 64×64 pixels, and (b) of FIG. 5 and (c) of FIG. 5 are diagrams showing a reproduction image in the single-pixel imaging method with no pixel shift of the related art and a reproduction image in the single-pixel imaging method with pixel shift of the present invention, and the number of random masks to be generated.

Figure 6:
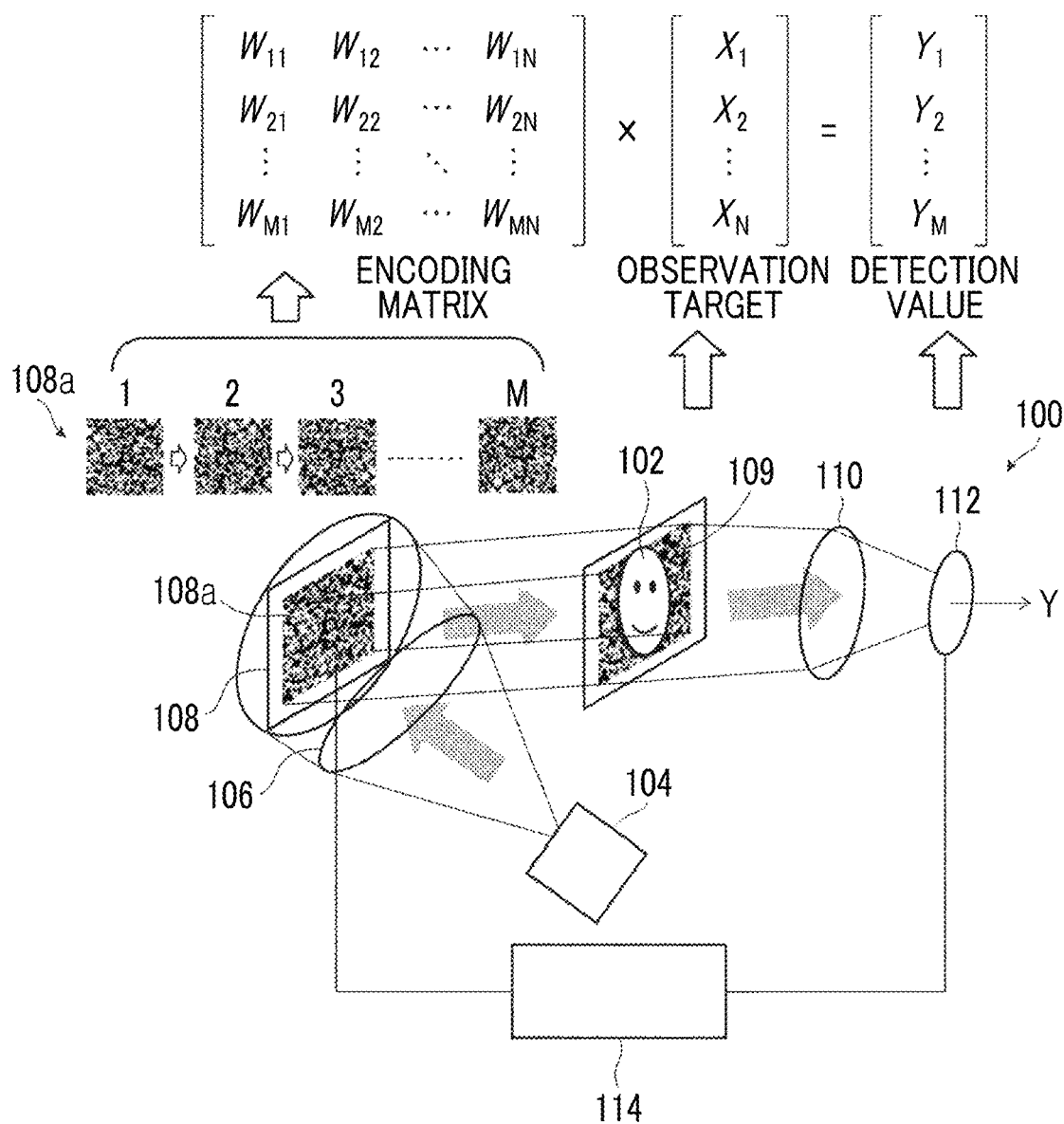

FIG. 6 is a schematic view showing the principle of a technique of single-pixel imaging.

Figure 7:
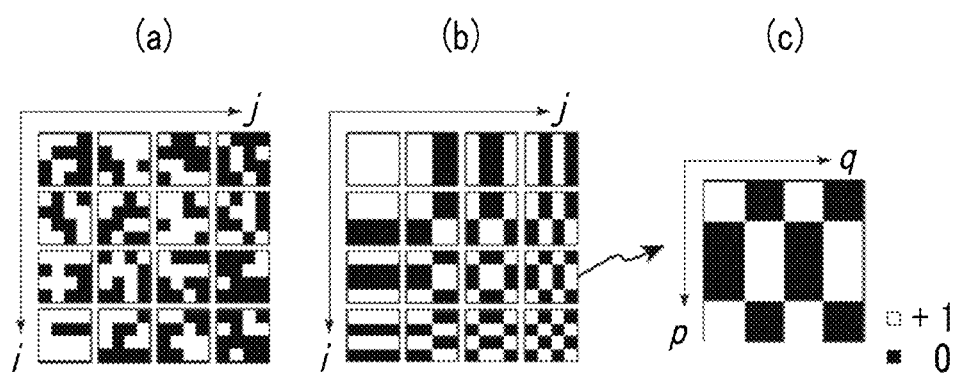

(a) of FIG. 7 is a diagram showing 16 (4×4) binary illumination random masks, (b) of FIG. 7 is a diagram showing 16 (4×4) binary illumination Hadamard masks, and (c) of FIG. 7 is a diagram showing one of the 16 Hadamard masks shown in (b) of FIG. 7 on an enlarged scale.

DESCRIPTION OF THE PREFERRED EMBODIMENTS

Hereinafter, an imaging method and an imaging device according to the present invention will be described in detail referring to a preferred embodiment shown in the accompanying drawings.

The description of components described below is provided based on a representative embodiment of the present invention, but the present invention is not limited to such an embodiment.

FIG. 1 is a schematic view schematically showing an example of an imaging device of the present invention that carries out an imaging method according to the present invention.

An imaging device 10 of the present invention shown in FIG. 1 is an imaging device that carries out the imaging method according to the present invention, and is a device that acquires image information of a target object 12 based on the principle of a technique of single-pixel imaging shown in FIG. 6.

The imaging device 10 shown in FIG. 1 has a light source 14 having a plurality of light emission points, a collimator lens 16, a spatial modulation element 18, a condenser lens 20, a single photodetector 22, and a computer 24.

In the imaging device 10 shown in FIG. 1, the light source 14 is a light source having a plurality of light emission points 15 (in the example shown in FIGS. 1, 15*a*, 15*b*, and 15*c*), and switches the light emission points 15 with respect to the single mask pattern of the spatial modulation element 18 at a high speed to perform pixel shift of the mask pattern with which the target object 12 to be an observation target is irradiated.

The light source 14 has a plurality of light emission points 15 (in the example shown in FIGS. 1, 15*a*, 15*b*, and 15*c*). The light source 14 is a light source that can switch, that is, can sequentially switch and turn on one light emission point 15 or two or more light emission points 15 to be made to emit light simultaneously among a plurality of light emission points at a high speed. Here, sequentially switching and turning on the light emission points 15 of the light source 14 refers to that the light emission point 15 is made to emit light and turned on within a time according to a light emission frequency, for example, within $10^{-7}$ seconds (sec) in a case where the light emission frequency of the light source 14 is 10 MHz and the previous light emission point 15 is turned off in switching and turning on the next light emission point 15. In the present invention, the speed of switching, that is, light emission, that is, turning-on of a plurality of light emission points 15 needs to be higher than the switching speed of the mask pattern of the spatial modulation element 18 described below.

That is, the light source 14 needs to sequentially switch and turn on one light emission point 15 or two or more light emission points 15 to be made to emit light simultaneously among a plurality of light emission points 15 in a period from generation of one mask pattern to generation of a next mask pattern of the spatial modulation element 18. Here, while the light source 14 needs to turn on a plurality of light emission points 15 with respect to the single mask pattern generated in the spatial modulation element 18, the light source 14 preferably sequentially turns on at least ten or more light emission points 15 and more preferably sequentially turns on all light emission points 15.

In the light source 14 shown in FIG. 1, only three light emission points 15*a*, 15*b*, and 15*c* are described as a plurality of light emission points 15. It is shown that, when the light emission point 15*a* emits light, light indicated by a dotted line is emitted, when the light emission point 15*b* emits light, light indicated by a solid line is emitted, and when the light emission point 15*c* emits light, light indicated by a one-dot chain line is emitted.

Such a light source 14 is not particularly limited insofar as a light source has a plurality of light emission points 15, an array type light source that can switch the positions of the light emission points 15 of the light source 14 is preferably used. Examples of such a light source 14 include a vertical cavity surface emitting laser (VCSEL) array that emits laser light perpendicular to a light surface from a plurality of light emission points 15, a light emitting diode (LED) array, or edge emitting semiconductor laser array. Among these, as the light source 14, the VCSEL array is more preferably used from a viewpoint of a point light source, ease of array configuration, and practical application.

Figure 2:
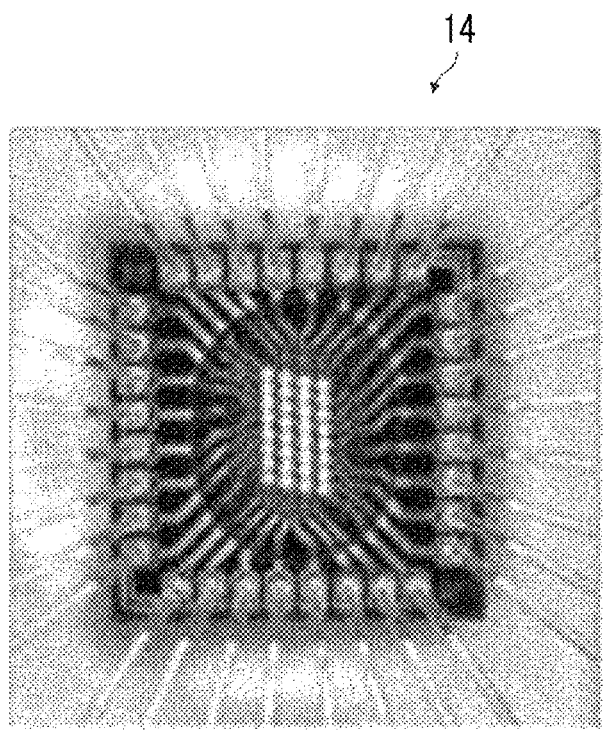
FIG. 2 is a plan view showing an example of a vertical cavity surface emitting laser (VCSEL) array that is used as a light source in the imaging device shown in FIG. 1.

FIG. 2 shows a VCSEL array having 32 (4×8) light emission points as an example of a preferred light source 14. The VCSEL array is manufactured by Fuji Xerox Co., Ltd. (see Vertical Cavity Surface Emitting Laser Diode (VCSEL)-VCSEL array and its application to the copier (Journal of Imaging Society of Japan, Vol. 44, No. 3 (2005)).

The collimator lens 16 converts light from the light source 14 into collimate light and irradiates the spatial modulation element 18 with collimate light. An example of the collimator lens 16 is a telecentric lens manufactured by ThorLABS Inc., such as AC508-100-A.

Here, a configuration from the light source 14 to the spatial modulation element 18 by way of the collimator lens 16 configures a first optical system that irradiates the spatial modulation element 18 with light from the light emission points 15 of the light source 14. Accordingly, it can be said that the first optical system has the collimator lens 16 between the light source 14 and the spatial modulation element 18.

It is shown that light indicated by the dotted line, the solid line, and the one-dot chain line respectively emitted from the three light emission points 15*a*, 15*b*, and 15*c* of the light source 14 shown in FIG. 1 becomes collimate light (parallel light) by the collimator lens 16.

Light indicated by the solid line emitted from the light emission point 15*b* at the center of the light source 14 is symmetrical to an optical axis of the first optical system and becomes collimate light that is parallel to the optical axis of the first optical system by the collimator lens 16.

In contrast, light indicated by the dotted line emitted from the light emission point 15*a* on an upper side of the light source 14 becomes light slightly angled to a lower side with respect to the optical axis of the first optical system, and becomes collimate light slightly angled the lower side with respect to the optical axis of the first optical system by the collimator lens 16. Light indicated by the one-dot chain line emitted from the light emission point 15*c* on a lower side of the light source 14 becomes light slightly angled to an upper side with respect to the optical axis of the first optical system, and becomes collimate light slightly angled to the upper side with respect to the optical axis of the first optical system by the collimator lens 16.

The spatial modulation element 18 is a two-dimensional spatial modulation element that generates a plurality of mask patterns. The spatial modulation element 18 generates a mask image (light) 19 that is modulated by making collimate light from the collimator lens 16 be transmitted or reflected according to one generated mask pattern, and irradiates the target object 12 with the generated mask image (light) 19.

The spatial modulation element 18 that is used in the present invention is not particularly limited insofar as a plurality of mask patterns can be generated, and is preferably a digital mirror device (DMD) or a liquid crystal spatial light modulator (LCSLM).

Here, a configuration from the spatial modulation element 18 to the target object 12 configures a second optical system that irradiates the target object 12 with the mask image 19 modulated according to the mask pattern 18a generated in the spatial modulation element 18.

In FIG. 1, for simplification of description, a configuration in which the spatial modulation element 18 generates a rectangular mask pattern 18a having 16 (4×4) elements is described, and it is represented that only two colored elements transmit or reflect light, and the remaining elements reflect or transmit light. Note that the number of elements of the spatial modulation element 18 is not particularly limited, and the number of elements is preferably greater. Here, a product of the number of elements of the spatial modulation element 18 and the number of light emission points 15 of the light source 14 to be sequentially switched in one mask pattern 18a presented by the spatial modulation element 18 becomes the total number of pixels of the target object 12.

A size of each element of the mask pattern generated in the spatial modulation element 18 is not particularly limited insofar as image information of all pixels of the target object 12 can be acquired, and is preferably the same size as a pixel required for the image information of the target object 12. In the present invention, switching of a light emission pattern of sequentially changing the light emission points 15 of the light source 14 with respect to the single mask pattern to perform pixel shift. For this reason, while the size of each element may be greater than the pixel required for the image information of the target object 12, in this case, a pixel shift amount is preferably the same as the pixel required for the image information.

As shown in FIG. 1, the target object 12 is irradiated with mask images 19a, 19b, and 19c modulated according to the mask pattern 18a generated by the spatial modulation element 18.

Here, the mask image 19b indicated by a solid line is a mask image (light) produced in such a manner that the light emission point 15b at the center of the light source 14 emits light, light is emitted symmetrically to the optical axis and collimated by the collimator lens 16, and collimate light that is parallel to the optical axis and has no shift is modulated by the mask pattern 18a of the spatial modulation element 18. Accordingly, the target object 12 is irradiated with the mask image (light) 19b from the front with no shift, and the mask image (light) 19b matches the mask pattern 18a with no pixel shift.

In contrast, the mask image 19a indicated by a dotted line is a mask image (light) produced in such a manner that the light emission point 15a on the upper side of the light source 14 emits light, light is emitted slightly downward and is collimated slightly downward with respect to the optical axis by the collimator lens 16, and collimate light is modulated by the mask pattern 18a of the spatial modulation element 18. Accordingly, the target object 12 is irradiated with the mask image (light) 19a in a state of having pixel shift to a lower left side, and the mask image (light) 19a has pixel shift slightly left downward with respect to the mask image (light) 19b matching the mask pattern 18a.

The mask image 19c indicated by a dotted line is a mask image (light) produced in such a manner that the light emission point 15c on the lower side of the light source 14 emits light, light is emitted slightly upward and is collimated slightly upward by the collimator lens 16, and collimate light is modulated by the mask pattern 18a of the spatial modulation element 18. Accordingly, the target object 12 is irradiated with the mask image (light) 19c in a state of having slight pixel shift to an upper right side, and the mask image (light) 19c has pixel shift slightly right upward with respect to the mask image (light) 19b matching the mask pattern 18a.

In the present invention, in this way, light emission pattern switching is performed a plurality of times (P), in the example shown in the drawing, three times with respect to the single mask pattern 18a of the spatial modulation element 18 using a plurality of light emission points 15, in the example shown in the drawing, the three light emission points 15 (15a, 15b, 15c) of the light source 14, whereby P mask images, in the example shown in the drawing, three mask images 19a, 19b, and 19c can be generated.

On the other hand, as the related art shown in FIG. 6 described above, in a case where the light source 104 that does not have a plurality of light emission points is used, only one mask image 109 can be generated with respect to the single mask pattern of the spatial modulation element 108.

Here, in a case where the number of pixels of the target object 12 is N, in general, N mask images 19 need to be generated.

For this reason, in the related art, the number of mask patterns that need to be generated in the spatial modulation element 108 is also N, a repetition frequency of the N mask patterns is restricted by the response speed of the spatial modulation element 108, and in a case where a switching time of the mask pattern is referred to as t, a time required for obtaining image information of all pixels of the target object 12 is Nt.

In contrast, in the present invention, since light emission pattern switching is performed P times with respect to the single mask pattern 18a of the spatial modulation element 18 such that P mask images 19 can be generated, the number of mask patterns that need to be generated in the spatial modulation element 18 can be set to N/P. As a result, in a case where a light emission time of the light emission point 15 is $t_e$, the time required for obtaining the image information of all pixels of the target object 12 can be set to $(t+Pt_e)N/P(=N(t/P+t_e))$. Here, since the light emission time $t_e$ is incomparably shorter than the switching time t of the mask pattern, the time required for obtaining the image information of the target object 12 can be substantially set to Nt/P, and an increase in speed of mask pattern irradiation in single-pixel imaging can be achieved.

For example, in a case where a VCSEL array having 32 light emission points shown in FIG. 2 is used as the light source 14, and all of the 32 light emission points are sequentially turned on with respect to the single mask pattern 18a of the spatial modulation element 18 to perform light emission pattern switching 32 times, the number of mask patterns 18a that are generated in the spatial modulation element 18 can be reduce to ⅟₃₂. Accordingly, the time for obtaining the image information of all pixels of the target object 12 can be substantially reduce to ⅟₃₂, and acquisition of the image information can be increased in speed.

In this way, the array light source 14 having a plurality of light emission points, such as a VCSEL array, is used as a light source that is used in single-pixel imaging, whereby high-speed switching of the mask pattern at a response speed of light emission of the light emission points 15 of the light source 14 is enabled by superimposing light emission pattern switching of a plurality of light emission points 15 of the light source 14 on modulation of the spatial modulation element 18, achieve an increase in speed of mask pattern irradiation in single-pixel imaging, and an input speed of single-pixel imaging can be increased.

A pixel shift amount of the mask image 19 according to the mask pattern 18a, which is generated by the spatial modulation element 18 and with which the target object 12 is irradiated, by movement of the positions of the light emission points 15 of the light source 14 is preferably equal to or greater than 10% of one pixel of the target object 12 either vertically or horizontally. The reason is that, in a case of less than 10%, the pixel shift amount is likely to enter an error range of the detection value of the detector 22 itself. A region where all pixel shift patterns overlap needs to include the entire region of the target object, and a pixel shift amount that satisfies such a condition is an upper limit of the pixel shift amount.

On the other hand, the mask pattern 18a that is generated by the spatial modulation element 18 has no periodic structure within a range of pixel shift generated by sequentially switching and turning on the light emission points 15 of the light source 14. The reason is that, in a case where the mask pattern 18a has a periodic structure within the range of pixel shift, when pixel shift corresponding to the periodic structure is performed, the same mask pattern is obtained.

The mask pattern 18a that is generated by the spatial modulation element 18 is preferably a random pattern or a Hadamard pattern.

In a case of the random pattern, since the mask pattern has no periodic structure, the same mask pattern is not obtained even though pixel shift is performed. An example of a random mask having such a random pattern is 16 (4×4) binary illumination masks shown in (a) of FIG. 7 described in A Study of Single-Pixel Imaging, Kyuki Shibuya, 2018, A Thesis for a degree of doctor (Optics), Thesis, Intelligent Structures and Mechanics Systems Engineering, Graduate School of Advanced Technology and Science, The university of Tokushima University.

The Hadamard pattern is a mask pattern that has elements of 1 or −1 and that corresponds to a Hadamard matrix as a square matrix with respective rows orthogonal to each other. An example of a Hadamard mask having such a Hadamard pattern is 16 (4×4) binary illumination masks shown in (b) of FIG. 7 described in A Study of Single-Pixel Imaging, Kyuki Shibuya, 2018, A Thesis for a degree of doctor (Optics), Thesis, Intelligent Structures and Mechanics Systems Engineering, Graduate School of Advanced Technology and Science, The university of Tokushima University. Here, n Hadamard masks that are used for illumination of an object can be created from a Hadamard matrix. As a generation method of a Hadamard mask, there are known two methods of a method of extracting each row or each column of the Hadamard matrix, converting each row or each column into a two-dimensional arrangement, and using the two-dimensional arrangement as a mask, and a method using a normal orthogonal base as a mask.

For example, in the Hadamard matrix, any two rows represent vectors perpendicular to each other. In a case where the Hadamard matrix is applied to a mask pattern, −1 is substituted with 0, and a Hadamard mask is used as a binary mask of 1 and 0 is used. That is, the Hadamard mask shown in (c) of FIG. 7 showing one of the 16 Hadamard mask shown in (b) of FIG. 7 is a binary mask where a white background is represented by +1 and a black background is represented by 0. This is called a Hadamard mask. With the use of such a Hadamard mask, it is known that image formation with less noise can be performed compared to the random mask, and it is effective for imaging with high accuracy.

In FIG. 1, while a path along which light emitted from each light emission point 15 of the light source 14 reaches the target object 12 is not described, in FIG. 3, a path along which light emitted from each light emission point 15 of the light source 14 reaches the target object 12 is shown as a ray.

A result shown in FIG. 3 is a result of performing a simulation using ZMAX as software for lens design of ray tracing on an assumption that a VCSEL array having three light emission points arranged at intervals of 5 mm is used as the light source 14, a telecentric lens (AC508-100-A manufactured by ThorLABS Inc.) is used as the collimator lens 16, and a DMD is used as the spatial modulation element 18.

As shown in FIG. 3, a ray indicated by a solid line emitted from a light emission point 15d on an upper side of the light source 14, a ray indicated by a one-dot chain line emitted from a light emission point 15e at the center, and a ray indicating by a broken line emitted from a light emission point 15f on a lower side are propagated while spreading, are narrowed by a stop 26 having a diameter of 40 mmφ provided on the light source 14 side of the collimator lens 16, and then, enter the collimator lens 16.

Collimate light indicated by the solid line, the one-dot chain line, and the broken line collimated in the collimator lens 16 is changing in angle little by little, becomes a telecentric optical system, and enters the spatial modulation element 18. Collimate light indicated by the solid line, the one-dot chain line, and the broken line that enters the spatial modulation element 18 is reflected from the spatial modulation element 18, and becomes mask images (light) with slight pixel shift indicated by a solid line, a one-dot chain line, and a broken line having the same predetermined mask pattern, and the target object 12 is irradiated with collimate light.

In this way, an optical system from the light source 14 to the target object 12, that is, an optical system including a first optical system that irradiates the spatial modulation element 18 with light from the light emission points 15 of the light source 14 and a second optical system that irradiates the target object 12 with the mask image 19 modulated according to the mask pattern 18a generated in the spatial modulation element 18 is preferably a telecentric optical system.

That is, the optical system from the light source 14 to the target object 12 is a telecentric optical system, whereby collimate light indicated by the solid line, the one-dot chain line, and the broken line collimated in the collimator lens 16 enters the spatial modulation element 18 without change even though an angle is slightly shifted from each other, and is reflected, and the target object 12 is irradiated with collimate light.

In this way, in the present invention, since a relationship between the light source 14 for which an array light source or the like is used and the collimator lens 16 becomes a telecentric optical system, pixel shift can be performed.

As shown in FIG. 3, originally, since the light emission points 15d and 15e and the light emission points 15e and 15f are shifted by 5 mm, the rays indicated by the solid line, the one-dot chain line, and the broken line have optical axes shifted from each other, and are different in angle. Note that, since the rays indicated by the solid line, the one-dot chain line, and the broken line match on a back focal plane of the collimator lens 16 and hit on the back focal plane at different angles in the same place, in a case where the spatial modulation element 18 is on the back focal plane, the target object 12 can be irradiated with the rays indicated by the solid line, the one-dot chain line, and the broken line without wasting the pixels of the spatial modulation element 18.

Accordingly, the spatial modulation element 18 is preferably disposed on the back focal plane of the collimator lens 16.

Next, the condenser lens 20 has the same function as the condenser lens 110 shown in FIG. 6, and condenses all of light transmitted through or reflected by the target object 12 in a case where the target object 12 is irradiated with the mask image (light) 19 modulated according to the predetermined mask pattern 18a from the spatial modulation element 18, to the detector 22.

The detector 22 is a single-pixel detector that has the same function as the detector 112 shown in FIG. 6, and has one light-receiving element to detect a light intensity of all of light condensed by the condenser lens 20 in one mask image (light) 19.

In the imaging device 100 shown in FIG. 6, since a plurality of mask patterns 108a that are generated in the spatial modulation element 108 are given as the mask patterns 1, 2, 3, . . . , and M, and become the mask images (light) 109 without change, the mask images are represented as the mask images (light) 1, 2, 3, . . . , and M, and the target object 102 is irradiated with the mask images (light) 1, 2, 3, . . . , and M.

In contrast, in the present invention, one light emission point or two or more light emission points among a plurality of light emission points of the light source 14 are made to sequentially and singly emit light (turned on and turned off) with respect to the single mask pattern 18a generated in the spatial modulation element 18 P times, whereby the target object 12 can be irradiated with the P mask images (light) 19. For this reason, in a case where the number of mask patterns 18a generated in the spatial modulation element 18 is referred to as Q, the number of mask images (light) 19 with which the target object 12 is irradiated is P×Q. In a case where the number P×Q of mask images (light) 19 is made to be equal to M described above (M=P×Q), in the present invention, the mask images can also be represented as the mask images (light) 1, 2, 3, . . . , and M, and the target object 12 is irradiated with the mask images (light) 1, 2, 3, . . . , and M.

In the present invention, instead of a plurality of mask patterns 1, 2, 3, . . . , and M generated in the spatial modulation element 108 of the related art shown in FIG. 6, a configuration is made such that the total number of mask images (light) 19 with which the target object 12 is irradiated, not a plurality of mask patterns 18a generated in the spatial modulation element 18, is M, whereby the mask images 1, 2, 3, . . . , and M can be obtained.

In this case, the mask image 1 is, for example, a mask image of a two-dimensional rectangular matrix where N pixels are arranged vertically and horizontally, and the two-dimensional N pixels can be converted into a matrix of one row and N columns and can be represented as $[W_{11}, W_{12}, \ldots, W_{1N}]$. Similarly, the mask image 2 can be represented as a matrix of one row and N columns, $[W_{21}, W_{22}, \ldots, W_{2N}]$, and the mask image M can be represented as a matrix of one row and N columns, $[W_{M1}, W_{M2}, \ldots, W_{MN}]$. In this manner, similarly to the case of the related art described above, the mask images 1, 2, 3, . . . , and M can be represented as an encoding matrix W ($W_{ij}$; i=1, 2, . . . , and M, j=1, 2, . . . , and N) of M rows and N columns represented by Expression (1) described above. Each element of the encoding matrix W ($W_{ij}$), that is, each of the elements $W_{11}, \ldots$, and $W_{MN}$ of each of the mask images 1, 2, 3, . . . , and M is not particularly limited, and for example, 1 for transmission and 0 for reflection or can be reversed.

As described above in detail, pattern light irradiation while physically shifting the light emission points 15 of the light source 14 is reflected in the encoding matrix W ($W_{ij}$) or the detection value Y. That is, pattern light irradiation is performed on the target object 12 while physically shifting the light emission points 15 of the light source 14 with respect to one mask pattern 18a generated in the spatial modulation element 18, that is, irradiation is performed while changing the mask image (light), whereby the encoding matrix W ($W_{ij}$) can be changed, and the detection value Y in which the change is reflected can be obtained.

In the present invention, in a case where each mask image of the mask images 1, 2, 3, . . . , and M with which the target object 12 is irradiated is used, and in a case where the detection values of the light intensities detected in the detector 22 are referred to as $Y_1, Y_2, \ldots$, and $Y_M$, similarly to the case of the related art described above, the matrix Y of M rows and one column represented by Expression (2) described above can be represented.

Here, in a case where the image information (image data) of the target object 12 is referred to as $X_1, X_2, \ldots$, and $X_N$, similarly to the case of the related art described above, the matrix X of M rows and 1 column represented by Expression (3) described above can be represented.

As a result, similarly to the case of the related art described above, the detection value Y can be represented by Y=WX as Expression (4) and can be represented as matrixes by Expression (4) described above.

The computer 24 performs pixel shift of the mask pattern 18a with which the target object 12 as an observation target is irradiated, by switching one light emission point or two or more light emission points of a plurality of light emission points 15 of the light source 14 with respect to the single two-dimensional mask pattern 18a generated in the spatial modulation element 18 at a high speed a plurality (P) of times, and can acquire P mask images 19. In this manner, the computer 24 can perform the acquisition of the P mask images 19 based on the same mask pattern 18a for a plurality (Q) of two-dimensional mask patterns 18a and can generate the mask images 1, 2, . . . , and M, and accordingly, it can be said that the encoding matrix W of M rows and N columns is already provided.

The computer 24 has a correlation of the detection value Y ($Y_1, Y_2, \ldots$, and $Y_M$) in a case where a plurality of two-dimensional mask images 1, 2, . . . , and M are used, and the mask images 1, 2, . . . , and M, and accordingly, has a correlation of the encoding matrix W of M rows and N columns. As described above, since the detection value Y, the encoding matrix W, and the image information X are represented by Y=WX as Expression (4) described above, the image information X can be represented by X=$W^{-1}$Y as Expression (5) where $W^{-1}$ is an inverse matrix of the encoding matrix W, and Expression (5) can be represented as matrixes by Expression (5) described above.

Accordingly, the correlation of the detection value Y ($Y_1$, $Y_2$, ..., and $Y_M$) measured in the imaging device 10 of the present invention shown in FIG. 1 and the encoding matrix W is calculated by the computer 24, whereby the image information of the target object 12, that is, image data X ($X_1$, $X_2$, ..., and $X_N$) of all pixels can be calculated by $X=W^{-1}Y$, that is, Expression (5) described above. The correlation of the encoding matrix W, the detection value Y, and the image information X can be obtained by measurement in advance and stored in the computer 24.

The imaging device that carries out the imaging method of the present invention has the above configuration.

Hereinafter, the imaging method of the present invention will be described referring to the imaging device 10 shown in FIG. 1.

First, an initial two-dimensional mask pattern 18a generated in the spatial modulation element 18 using the imaging device 10 having the configuration shown in FIG. 1, and is set as the mask pattern 1.

In the light source 14 having a plurality of light emission points 15, one light emission point 15 to be turned on initially or two or more light emission points 15 to be made to emit light simultaneously are turned on, and the spatial modulation element 18 that generates the mask pattern 1 is irradiated with light from the light emission points 15 that are turned on.

As a result, with superimposition of the mask pattern 1 generated in the spatial modulation element 18 and light from the light emission points 15 that are turned on, the mask image (light) 19 modulated according to the mask pattern 1 is generated, and the target object 12 is irradiated with the mask image (light) 19 as the mask image (light) 1.

Next, light transmitted through the target object 12 or reflected by the target object 12 irradiated with the mask image 1 is condensed by the condenser lens 20, and the light intensity of the condensed light is detected as the detection value Y by the detector 22.

In this manner, the detection value Y ($Y_1$) of the light intensity by the mask image 1 obtained with superimposition of the initial mask pattern 1 and the light emission points 15 of the light source 14 that are initially turned on can be obtained.

Next, the initial mask pattern 1 is left without change, and sequentially switching one light emission point or two or more light emission points 15 of the light source 14 and detecting the light intensity by the detector 22 in the same manner while switching the mask image 19 (mask image 2, ..., and P) that causes pixel shift to be sequentially generated are repeated P times in total until switching of the light emission points 15 of the light source 14 ends, and the detection values Y ($Y_2$, ..., and $Y_P$) of the light intensities by the mask images 2, ..., and P can be obtained.

Next, sequentially generating the two-dimensional mask pattern 18a (mask pattern 2) different from the previous mask pattern in the in the spatial modulation element 18 and switching the P mask images 19 to obtain P detection values of the light intensities while sequentially switching the light emission points 15 of the light source 14 are repeated while switching the mask pattern 18a to the mask patterns 2, 3, ..., and Q. Here, it is assumed that P×Q=M.

In this manner, M (=P×Q) detection values Y ($Y_1$, $Y_2$, ..., $Y_M$) with respect to M (=P×Q) mask images 1, 2, ..., and M can be obtained.

Here, it can be calculated by the computer 24 that the M (=P×Q) mask images 1, 2, ..., and M by the combination of Q times of switching of the mask pattern 18a and P times of switching of the light emission pattern depending on the positions of the light emission points 15 of the light source 14 in the single mask pattern 18a can be represented by the encoding matrix W.

Accordingly, in a case where the M (=P×Q) detection values Y ($Y_1$, $Y_2$, ..., and $Y_M$) can be obtained, the computer 24 can construct the image information (image data X ($X_1$, $X_2$, ..., and $X_N$)) of the target object 12 by calculating the correlation of the mask images 1, 2, ..., and M with which the target object 12 is irradiated and the detection values $Y_1$, $Y_2$, ..., $Y_M$) of the light intensities detected by the detector 22. That is, the computer 24 can obtain the image information of the target object 12, that is, image data X ($X_1$, $X_2$, ..., and $X_N$) of all pixels by obtaining the correlation of the encoding matrix W and the detection value Y, and specifically, calculating Expression (5) described above, $X=W^{-1}Y$.

Here, the computer 24 can acquire all the image information of the of the target object 12 by calculating the correlation of the mask image 19 according to the mask pattern 18a that generates pixel shift by sequentially switching and turning on one light emission point 15 or two or more light emission points 15 to be made to emit light simultaneously among a plurality of light emission points 15 of the light source 14 with respect to the single mask pattern 18a generated in the spatial modulation element 18, and the light intensity detected by the detector 22 when the target object 12 is irradiated with the mask image 19, for all combinations of the plurality of mask patterns and the light emission pattern depending on the positions of the light emission points 15 of the light source 14 to be sequentially switched.

In the present invention, the target object 12 is irradiated with the mask images 19 according to plurality of mask patterns 18a depending on the positions of the light emission points 15 of the light source 14 and the spatial modulation element 18. In this case, the pixels of the mask image 19 with which the target object 12 is irradiated are shifted by the determined distance by sequentially turning on one light emission point or two or more light emission points among a plurality of light emission points 15 of the light source 14 with respect to the single mask pattern 18a generated in the spatial modulation element 18.

The pixel shift amount of the mask pattern 18a that is determined by the positions of the light emission points 15 to be turned on of the light source 14 can be measured, and thus, is known.

The present invention introduces pixel shift using the array type light source 14 having the light emission points at a plurality of positions, such as a VCSEL array capable of switching the positions of the light emission points 15 of the light source 14 at a high speed, for the two-dimensional spatial modulation element 18.

That is, in the present invention, an array light source having light emission points disposed at a plurality of positions, such as a VCSEL array, is used as the light source 14 for mask pattern projection by the spatial modulation element 18, such as a DMD or a liquid crystal SLM. Accordingly, the light emission points 15 of the light source 14 where spatial modulation can be performed faster are sequentially switched with respect to one mask pattern 18a of the spatial modulation element 18, whereby it is possible to shift the position of the mask pattern that is projected onto the target object 12 as an object to be measured, at a high speed. As a result, the target object 12 can be irradiated with a plurality of mask images (light) 19 with pixel shift with respect to one mask pattern 18a. With this, it is possible to project a number of mask images 19 by the mask pattern onto the target object 12 in a short time.

In the present invention, pixel shift is performed on the mask pattern 18a by the spatial modulation element 18 using the light source 14 having the light emission points 15 at a plurality of positions, such as a VCSEL array capable of performing higher-speed switching, whereby it is possible to improve a speed at a maximum of a magnification for the number of light emission points 15 or the number of arrays.

It is possible to perform high-speed switching of the mask image 19 based on the mask pattern 18a at the response speed of the light source 14, such as a VCSEL array, by superimposing light emission pattern switching of the light source 14 having the light emission points 15 at a plurality of positions, such as a VCSEL array, on the modulation of the spatial modulation element.

Accordingly, the present invention can achieve a significant increase in speed compared to the method of the related art. In the present invention, since an easily available array light source, such as a VCSEL array, an LED array, or an edge emitting semiconductor laser array, can be used as the light source 14, high practicality is achieved. In addition, in the present invention, a resolution of a mask can be increased by adjusting the amount of pixel shift.

The imaging method and the imaging device of the present invention are basically configured as above.

Next, comparison of mask presentation times depending on the presence or absence of pixel shape is performed.

Here, it is assumed that a DMD having a switching frequency of the mask pattern 18a of 10 kHz is used as the spatial modulation element 18 regardless of the presence or absence of pixel shift.

As in the imaging device 10 of the present invention shown in FIG. 1, it is assumed that, to perform pixel shift of the mask pattern 18a of the spatial modulation element 18, a VCSEL array having a switching frequency of the light emission points 15 of 10 MHz is used as the light source 14.

As in the imaging device 100 of the related art shown in FIG. 6, a normal continuous light source is used as the light source 104 in a case where pixel shift is not performed.

Figure 4A:
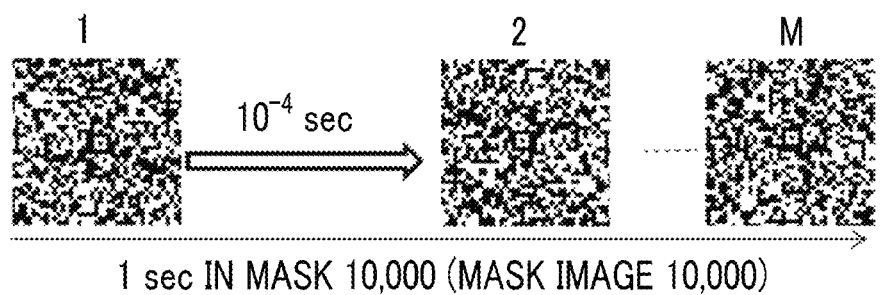
FIG. 4A is a schematic view showing a mask presentation time in a single-pixel imaging method with no pixel shift of the related art.

As shown in FIG. 4A, in a case of no pixel shift of the related art, generation of one mask (mask pattern) by the DMD of 10 kHz requires $10^{-4}$ seconds (sec). In a case of no pixel shift, a mask image with which the target object as an object to be measured is irradiated is generated for each mask (mask pattern) that is generated by the DMD. Accordingly, since 10,000 mask images need to be generated by generating 10,000 masks (mask patterns), it is understood that one second (sec) is required.

Figure 4B:
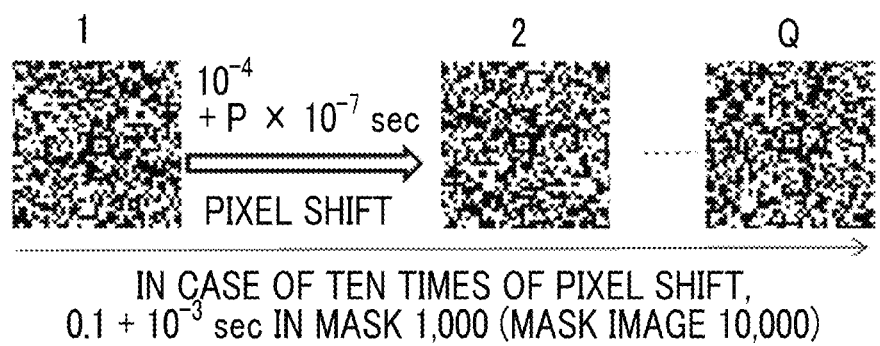
FIG. 4B is a schematic view showing a mask presentation time in a single-pixel imaging method with pixel shift of the present invention.

In contrast, as shown in FIG. 4B, in a case of pixel shift of the present invention, since pixel shift is performed ten times by the VCSEL array of 10 MHz with respect to one mask (mask pattern) that is generated by the DMD of 10 kHZ, a required time in one mask (mask pattern) is $(10^{-4} + 10 \times 10^{-7})$ seconds (sec).

In this case, since pixel shift is performed ten times with respect to one mask (mask pattern), ten mask images are generated.

In this case, similarly to the case shown in FIG. 4A, while mask images with which the target object as an object to be measured is irradiated is 10,000, since the ten mask images are generated with respect to one mask (mask pattern), the number of required masks (mask patterns) is 1,000 (=10,000/10).

From the above, in a case of pixel shift of the present invention, since 1,000 mask (mask patterns) are required, it is understood that $(10^{-4} + 10 \times 10^{-7}) \times 1,000 = (0.1 + 10^{-3})$ seconds (sec) are required.

That is, in a case of obtaining image information of the same resolution (the number of pixels), it is understood that, in a case of pixel shift of the present invention, the number of masks (mask patterns) is 1/10, such that simplification can be achieved, and the required time is substantially 1/10, such that an increase in speed of substantially ten times can be achieved, compared to a case of no pixel shift of the related art.

Next, a simulation is performed to confirm effects of pixel shift of the present invention.

(a) of FIG. 5 shows an original image of 64×64 (=4096) pixels.

(b) of FIG. 5 shows a reproduction image that is reproduced with respect to the number of random masks (random mask pattern) to be generated in a case of no pixel shift of the related art. Since one random mask is generated by single modulation of the DMD, the number of random masks to be generated corresponds to the number of times of modulation of the DMD.

In a case of no pixel shift of the related art shown in (b) of FIG. 5, it is understood that, in a case where the number of generated random masks (random mask pattern) is 256, the number of mask images with which the original image is irradiated is also 256, the whole original image shown in (a) of FIG. 5 is not reproduced with the number of mask images, sufficient reproduction is not viewed even though the number of mask images is 1024 and 2048, and in a case where the number of mask images is 4,096 the same as the number of pixels of the original image, a reproduction image with the same resolution as the original image is obtained.

On the other hand, (c) of FIG. 5 shows a reproduction image that is reproduced with respect to the number of generated random masks in a case of pixel shift of the present invention.

In this case, when pixel shift is performed assuming that the light source is a 4×4 array light source, the number of required masks in the DMD is shown. Since the number of light emission points of the light source is 16, a simulation is performed in such a manner that pixel shift is performed 16 times with respect to one random mask (random mask pattern) generated by single modulation of the DMD. With the simulation, it has been confirmed that, in a case of pixel shift, an image is reproduced with generation of the number of mask patterns divided by the number of times K (in this case, 16) of pixel shift, compared to a case of no pixel shift.

That is, in a case where pixel shift can be performed 16 times with respect to one random mask (random mask pattern), 16 mask images with which the original image is irradiated can be generated. For this reason, in (b) of FIG. 5 of no pixel shift, since the number of mask images with which a reproduction image with the same resolution as the original image is obtained is 4,096, it is understood that, in a case of pixel shift of the present invention, 256 (=4096/16) random masks (random mask pattern) may be generated by the DMD in generating the 4,096 mask images.

(c) of FIG. 5 shows that a reproduction image with the same resolution as the original image is obtained in 256 random masks (random mask pattern).

As described above, the effects of the present invention are apparent.

Although the imaging method and the imaging device of the present invention have been described above in detail in connection with various embodiments and examples, the present invention is not limited to such embodiments and examples, and various improvements or alterations may be of course made without departing from the spirit and scope of the present invention.

EXPLANATION OF REFERENCES 10, 100: imaging device
12, 102: target object
14, 104: light source
15, 15a, 15b, 15c, 15d, 15e, 15f: light emission point
16, 106: collimator lens
18, 108: spatial modulation element
18a, 108a: mask pattern
19, 19a, 19b, 19c, 109: mask image (light)
20, 110: condenser lens
22, 112: photodetector
24, 114: computer
26: stop

What is claimed is:

1. An imaging method comprising:
by a computer, calculating, in irradiating a spatial modulation element configured to generate a plurality of mask patterns, with light from a light source having a plurality of light emission points, irradiating a target object with a mask image modulated according to the mask pattern generated by the spatial modulation element, condensing light transmitted through or reflected by the target object irradiated with the mask image, and detecting a light intensity of the condensed light by a detector,
for all combinations of the plurality of mask patterns and a light emission pattern of the light emission points to be sequentially switched, a correlation between the mask image according to the mask pattern that generates pixel shift by sequentially switching and turning on one light emission point or two or more light emission points to be made to emit light simultaneously among the plurality of light emission points with respect to the single mask pattern generated in the spatial modulation element, and the light intensity detected by the detector when the target object is irradiated with the mask image, to acquire an image of the target object,
wherein pixels of the mask image with which the target object is irradiated are shifted by a determined distance by sequentially turning on one light emission point or two or more light emission points of the light source with respect to the single mask pattern generated in the spatial modulation element,
a pixel shift amount of the mask pattern determined by a position of the light emission point to be turned on of the light source is known, and
the target object is irradiated with the mask images according to the plurality of mask patterns depending on the positions of the light emission points of the light source and the spatial modulation element, and the computer calculates the correlation between the light intensity detected by the detector and the mask image with which the target object is irradiated, to construct the image of the target object.

2. The imaging method according to claim 1,
wherein the light source is a vertical cavity surface emitting laser (VCSEL) array.

3. The imaging method according to claim 2,
wherein the spatial modulation element is a digital minor device (DMD) or a liquid crystal spatial modulation element.

4. The imaging method according to claim 2,
wherein the one light emission point or the two or more light emission points to be made to emit light simultaneously of the light source are sequentially switched and turned on in a period from generation of the mask image of the mask pattern of the spatial modulation element to generation of the mask image of the next mask pattern.

5. The imaging method according to claim 2,
wherein the pixel shift amount of a mask pattern, with which the target object is irradiated, by position movement of the light emission point of the light source is 10% or more of one pixel either vertically or horizontally.

6. The imaging method according to claim 2,
wherein an optical system from the light source to the target object is a telecentric optical system.

7. The imaging method according to claim 2,
wherein a collimator lens is provided between the light source and the spatial modulation element, and the spatial modulation element is disposed on a back focal plane of the collimator lens.

8. The imaging method according to claim 2,
wherein the mask patterns that are generated by the spatial modulation element have no periodic structure within a range of pixel shift generated by sequentially switching and turning on the light emission points.

9. The imaging method according to claim 2,
wherein the mask patterns that are generated by the spatial modulation element are random patterns or Hadamard patterns.

10. The imaging method according to claim 1,
wherein the light source is a light emitting diode (LED) array or an edge emitting semiconductor laser array.

11. The imaging method according to claim 10,
wherein the spatial modulation element is a digital minor device (DMD) or a liquid crystal spatial modulation element.

12. The imaging method according to claim 10,
wherein the one light emission point or the two or more light emission points to be made to emit light simultaneously of the light source are sequentially switched and turned on in a period from generation of the mask image of the mask pattern of the spatial modulation element to generation of the mask image of the next mask pattern.

13. The imaging method according to claim 1,
wherein the spatial modulation element is a digital minor device (DMD) or a liquid crystal spatial modulation element.

14. The imaging method according to claim 1,
wherein the one light emission point or the two or more light emission points to be made to emit light simultaneously of the light source are sequentially switched and turned on in a period from generation of the mask image of the mask pattern of the spatial modulation element to generation of the mask image of the next mask pattern.

15. The imaging method according to claim 1,
wherein the pixel shift amount of a mask pattern, with which the target object is irradiated, by position movement of the light emission point of the light source is 10% or more of one pixel either vertically or horizontally.

16. The imaging method according to claim 1,
wherein an optical system from the light source to the target object is a telecentric optical system.

17. The imaging method according to claim 1,
wherein a collimator lens is provided between the light source and the spatial modulation element, and the spatial modulation element is disposed on a back focal plane of the collimator lens.

18. The imaging method according to claim 1,
wherein the mask patterns that are generated by the spatial modulation element have no periodic structure within a range of pixel shift generated by sequentially switching and turning on the light emission points.

19. The imaging method according to claim 1,
wherein the mask patterns that are generated by the spatial modulation element are random patterns or Hadamard patterns.

20. An imaging device comprising:
a light source having a plurality of light emission points;
a spatial modulation element that generates a plurality of mask patterns;
a first optical system that irradiates the spatial modulation element with light from the light emission points of the light source;
a second optical system that irradiates a target object with a mask image modulated according to the mask patterns generated by the spatial modulation element irradiated with light from the light emission points of the light source;
a detector that condenses light transmitted through the target object or reflected by the target object irradiated with the mask image and detects a light intensity of the condensed light; and
a computer that calculates, for all combinations of the plurality of mask patterns and a light emission pattern of the light emission points to be sequentially switched, a correlation between the mask image according to the mask pattern that generates pixel shift by sequentially switching and turning on one light emission point or two or more light emission points to be made to emit light simultaneously among the plurality of light emission points with respect to the single mask pattern generated in the spatial modulation element, and the light intensity detected by the detector when the target object is irradiated with the mask image, to acquire an image of the target object,
wherein pixels of the mask image with which the target object is irradiated are shifted by a determined distance by sequentially turning on one light emission point or two or more light emission points of the light source with respect to the single mask pattern generated in the spatial modulation element,
a pixel shift amount of the mask pattern determined by a position of the light emission point to be turned on of the light source is known, and
the target object is irradiated with the mask images according to the plurality of mask patterns depending on the positions of the light emission points of the light source and the spatial modulation element, and the computer calculates the correlation between the light intensity detected by the detector and the mask image with which the target object is irradiated, to construct the image of the target object.

* * * * *